W. R. ROGERS.
MARKING DEVICE.
APPLICATION FILED SEPT. 19, 1911.
1,057,456. Patented Apr. 1, 1913.
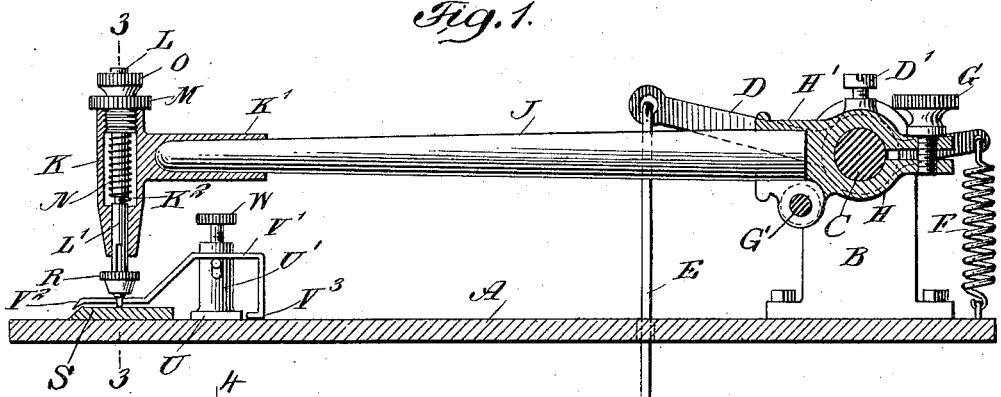
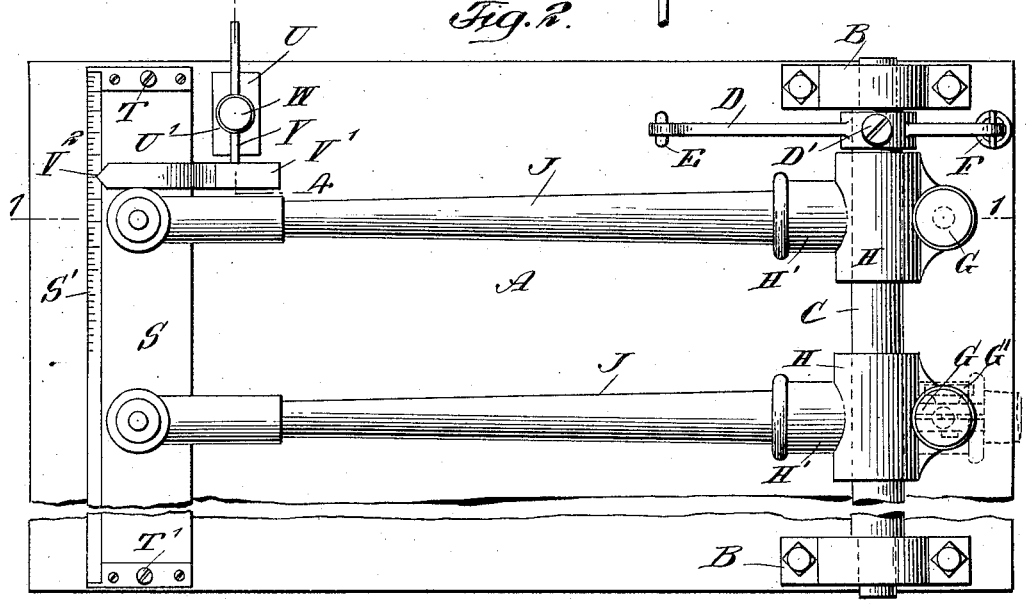
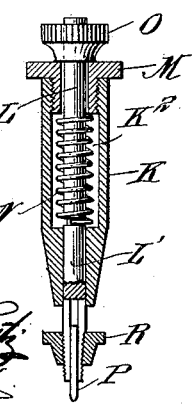
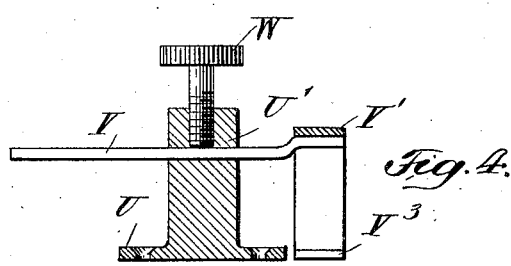
Witnesses:
Inventor
William R. Rogers
By his Attorney
John Lotka

UNITED STATES PATENT OFFICE.

WILLIAM ROY ROGERS, OF NEWARK, NEW JERSEY.

MARKING DEVICE.

1,057,456. Specification of Letters Patent. Patented Apr. 1, 1913.

Application filed September 19, 1911. Serial No. 650,192.

*To all whom it may concern:*

Be it known that I, WILLIAM R. ROGERS, a citizen of the United States, and a resident of Newark, in the county of Essex and State of New Jersey, have invented certain new and useful Improvements in Marking Devices, of which the following is a specification.

My invention relates to devices for making marks on various materials and particularly on woven fabrics.

The present improvement has been devised chiefly for the purpose of marking on a fabric (say, a waist) the proper places for a number of button-holes and for the corresponding buttons. The device is however capable of a general application in all cases where it is desired to put a plurality of marks in the same relative position upon two or more articles.

The invention will be fully described hereinafter, and the features of novelty pointed out in the appended claims.

Reference is to be had to the accompanying drawings, in which—

Figure 1 is a vertical section through a typical form of my invention, taken on the line 1—1 of Fig. 2; Fig. 2 is a top view, with parts broken away; Fig. 3 is a section, substantially on line 3—3 of Fig. 1, showing the marker proper on an enlarged scale; and Fig. 4 is a vertical section on the line 4—4 of Fig. 2, showing an adjustable gage which I may use in connection with the marker.

The device is carried by a suitable support or table A, to which are secured brackets B formed with bearings for a rock shaft C. Any suitable means may be employed for actuating the shaft. I have shown an arm D secured to the shaft by means of a set screw D'. One end of the arm D is connected by a wire E or the like with a pedal or other operating member (not shown), and the other end of the arm is connected with a coiled spring F having its other end secured to a stationary part, as the table A. The spring F restores the shaft C and the parts carried thereby, to their normal position, as soon as the pedal or other operating member is released.

On the shaft C are secured adjustably, by means of clamping screws G, the T-shaped sleeves or carriers H. Fig. 2 shows two of these sleeves, but a greater number is generally employed in practice, say five or six. The construction shown allows the carriers H to be adjusted individually lengthwise of the rock shaft C and to be locked after adjustment, by tightening the corresponding screws G. Each carrier has a substantially radial split socket H', (with clamping screw G') into which extends the inner end of an arm J, the outer end of which is tapered to fit into a socket K' attached to or integral with the marker body K. The body K and the marker proper carried thereby can thus be detached readily from the arm J when desired, yet under normal conditions the taper fit of the outer end of the arm J in the socket K' will hold the parts firmly enough to prevent accidental separation. The marker body has a preferably cylindrical cavity extending from top to bottom and forming two chambers of different width. In the lower chamber, which is the narrower, is adapted to slide vertically the body L' of a plunger, whose upper end L slides in a nut M screwing into the upper end of the wider upper chamber $K^2$. The plunger is adapted to slide in a direction which is tangential to the arc or path in which the body or casing K is adapted to swing, the center of such arc being on the axis of shaft C. A coiled spring N surrounds the plunger portion L below the nut M and has its lower end inserted in an annular groove formed at the top of the plunger body L', thus tending to press the plunger down. The downward movement of the plunger relatively to the casing K is limited variably by means of the nut O screwed on the upper end L of the plunger, above the nut M. The lower end of the plunger is tubular and split to form an elastic holder for the marker proper P, which consists of lead (graphite) or other suitable substance. The lower end of the plunger, which projects from the body or casing K, is tapered and screw-threaded externally to receive a nut R, which has the double function of contracting the split end of the plunger to clamp the lead P, and of limiting the downward movement of the body or casing K relatively to the plunger, under circumstances to be explained presently. Normally (that is, with the nut O against the nut M) a space intervenes between the nut P and the lower end of the body or casing K, as shown in Figs. 1 and 3.

The material or garment on which marks are to be made, might be placed directly on the table A, but I prefer to employ a cushion, which in the particular construction shown comprises a wood strip S set on the table. The strip S, (which extends parallel with the shaft C) is secured to the table A by screws or other fasteners T, T', the outer edge of the screw-head T, may serve as a gage for the end of the material or fabric. A scale S' may be provided on the strip to assist in the proper adjustment of the carriers H and markers O relatively to each other.

In some cases it may be desirable to have an adjustable gage, particularly when for some reason or other it is not convenient to place the end of the fabric against the gage T. Figs. 1, 2 and 4 illustrate an adjustable gage comprising a plate U secured to the table A and having a guide or socket U', in which a rod V is mounted to slide in a direction parallel to the shaft C and to the scale S'. One end of the rod V carries the gage proper V' formed with a pointer V² adapted to indicate on the scale S', and with a foot V³ adapted to rest on the table A. A set screw W secures the gage in position after adjustment. If for instance it is not feasible to bring the end of the fabric against the gage T, but the fabric has a suitable mark, say at 1½ inch from the end, which may be made to register with the gage pointer V², the latter would be adjusted to a distance of 1½ inch from the gage T, which preferably is the zero point of the scale S'.

The operation of the marking device is as follows: First, with the aid of the scale S' or otherwise, the several markers P are adjusted to the proper distances apart. Then the operator places the fabric on the cushion or the table, in the path of the markers, and in proper position as determined by the gage T or V'. Thereupon the shaft C is rocked quickly forward to swing the arms J and markers P downward. The markers P and the marker bodies or casings K move in unison until the points of the markers strike the fabric. If the markers were rigid with the casings K, only dots, and not very distinct ones, would be produced on the fabric. Owing to the sliding connection of each marker with its casing, the casing can continue to move downward after the point of the marker has struck the fabric, until the lower end of the casing K comes against the nut R. Inasmuch as the lower end of the casing K, being rigidly connected with the shaft C, swings in the arc of a circle, the movement of the casing K relatively to the marker moves the marker on the fabric slightly toward the shaft C, since in the retracted position the point of the marker is slightly nearer the axis of the shaft C than in the projected position (Fig. 3). Thus the point of the marker will not simply strike the fabric, but will also be drawn inward a short distance, producing a clearly visible very short dash, instead of a faint dot.

When for any reason it desired to temporarily put out of action one or more of the markers carried by the rock shaft, it is not necessary to remove such marker, but it will suffice to loosen the corresponding clamping screw G and to swing the carrier H with its arm J and marker P to the inoperative position indicated by dotted lines in Fig. 2. The rocking of the shaft C will not affect any arm J which is in this inoperative position.

Various modifications may be made without departing from the nature of my invention as set forth in the appended claims.

I claim:

1. A marking device comprising a rock shaft, a plurality of marker casings, individual means for connecting said casings with the shaft rigidly, during its operation, but adjustable individually lengthwise of the shaft, a marker mounted to slide in each casing transversely of the shaft, and elastic means tending to project the marker from its casing.

2. A marking device comprising a rock shaft, clamping carriers mounted on said shaft adjustably, clamping screws for locking the carriers on the shaft, marker casings and means for connecting them with said carriers, and spring-pressed markers projecting from said casings.

3. A marking device comprising a rock shaft, carriers each provided with a sleeve portion fitted on the shaft and with a socket portion projecting in a substantially radial direction, an arm having its inner end fitted into said socket, and a marker connected with the outer end of the arm and disposed tangentially to the arc of oscillation.

4. A marking device comprising a rocking member, arms projected therefrom transversely to the axis of oscillation, marker casings each of which has a socket to receive the outer end of one of said arms, and a slideway tangential to the arc of oscillation, and a spring-pressed marker guided by said slideway.

5. A marking device comprising a rocking member, marker casings, means for connecting said marker casings rigidly with said member, each marker casing being provided with a cavity extending transversely of the axis about which said member rocks, said cavity having two chambers of different width, a marker-carrying plunger mounted to slide in said cavity, a spring surrounding the plunger in the wider chamber, and a nut engaging the other end of the spring, said nut being fitted to the casing and provided with an opening in which a portion of the plunger has guided movement.

6. A marking device comprising a rocking marker casing, a spring-pressed marker-carrying plunger mounted to slide in the casing in a direction tangential to the path of the said casing, and two stops, one to limit the outward and the other to limit the inward movement of the plunger relatively to the casing.

7. A marking device comprising a rocking marker casing, a spring-pressed marker-carrying plunger mounted to slide in the casing in a direction tangential to the path of the casing and projecting therefrom, and a stop secured to the projecting portion of the plunger, to limit its inward sliding movement.

8. A marking device comprising a rocking marker casing, a spring-pressed plunger mounted to slide in the casing in a direction tangential to the path of the casing and provided with a split tubular end projecting from the casing and adapted to hold a marker, and a nut screwing on said tubular end to compress it, said nut being adapted to engage the marker casing to limit the inward sliding movement of the plunger.

9. A marking device comprising a rocking marker casing having a slideway, a plunger movable in said slideway and projecting from the casing at both ends, a marker carried by one end of said plunger, and stops carried by each of the projecting end portions of the plunger exteriorly of the casing to limit the movement of the plunger in either direction.

10. A marking device comprising a plurality of movable markers, a table, a strip-like cushion secured to the table, to serve as a support for the fabric to be marked, and a gage adjustable lengthwise of said cushion and provided with a pointer extending adjacent to the cushion and with a foot engaging the table.

In testimony whereof I have signed this specification in the presence of two subscribing witnesses.

WILLIAM ROY ROGERS.

Witnesses:
 JOHN LOTKA,
 CHARLES MATHÉ.

---

Copies of this patent may be obtained for five cents each, by addressing the "Commissioner of Patents, Washington, D. C."